Nov. 20, 1962  A. J. SCHUBERT ET AL  3,065,287
PROCESS AND APPARATUS FOR MANUFACTURING
DRY CHARGED STORAGE BATTERY PLATES
Filed Dec. 7, 1960  3 Sheets-Sheet 1
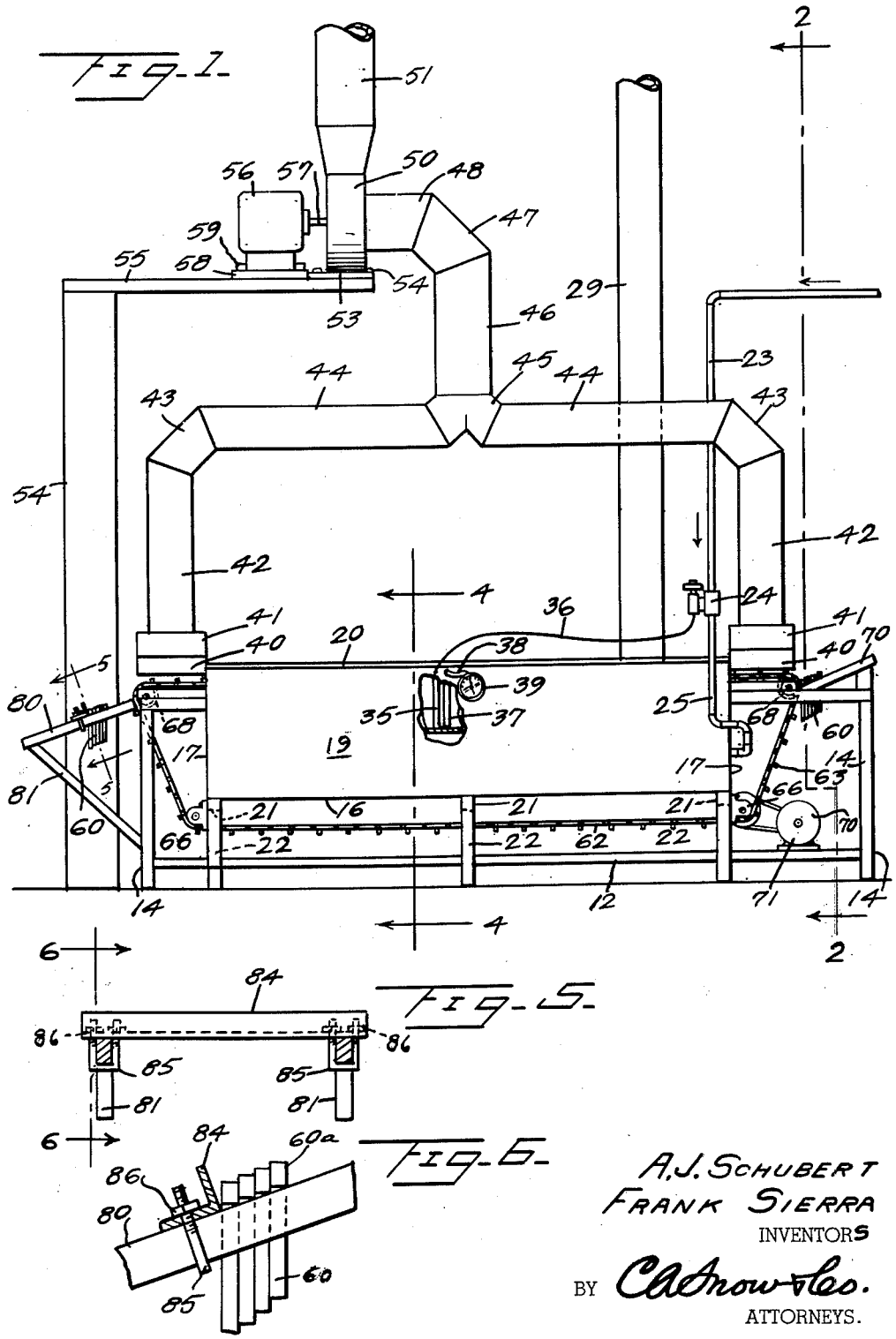
A.J. SCHUBERT
FRANK SIERRA
INVENTORS
BY *CA Snow & Co.*
ATTORNEYS.

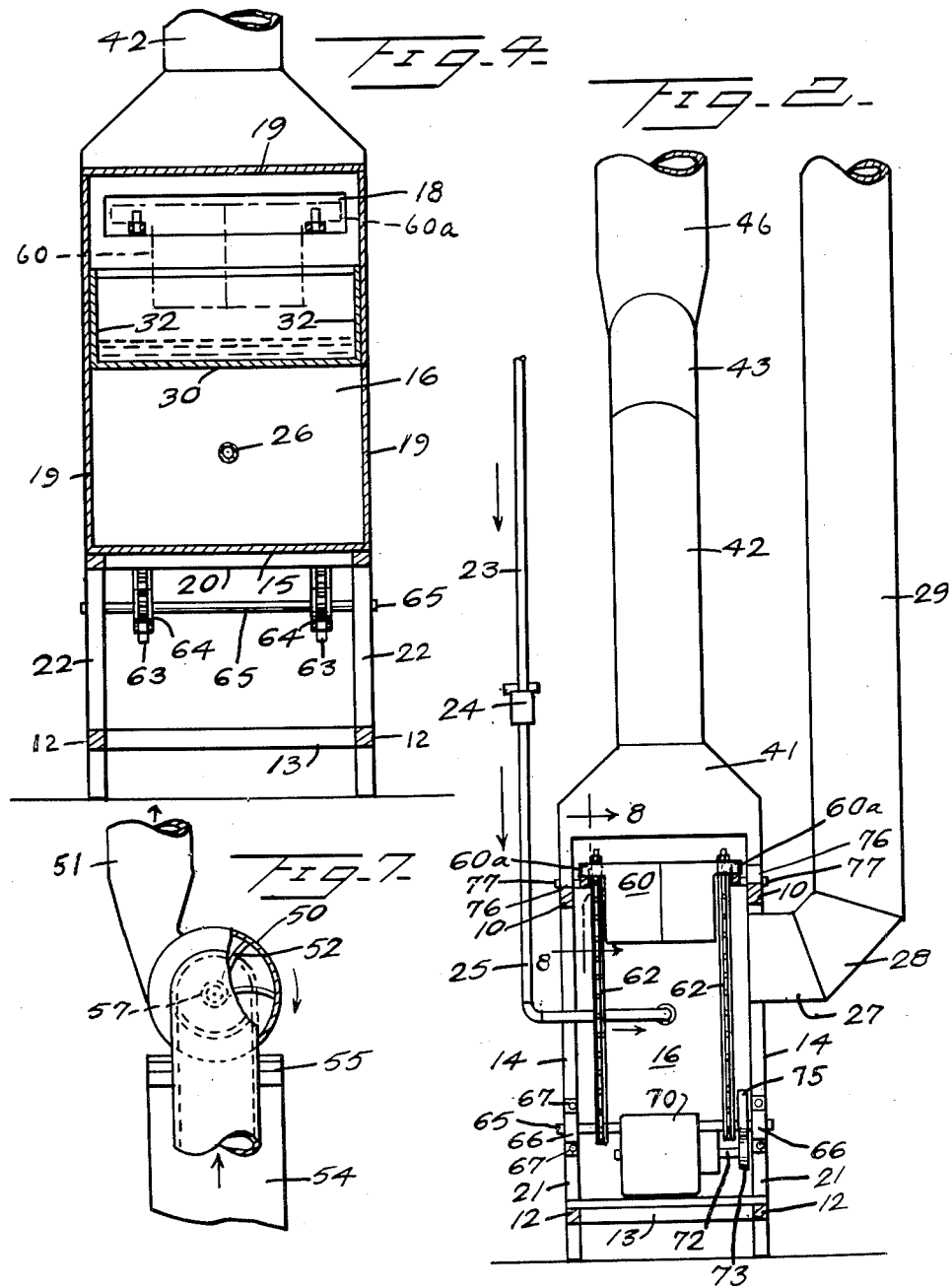

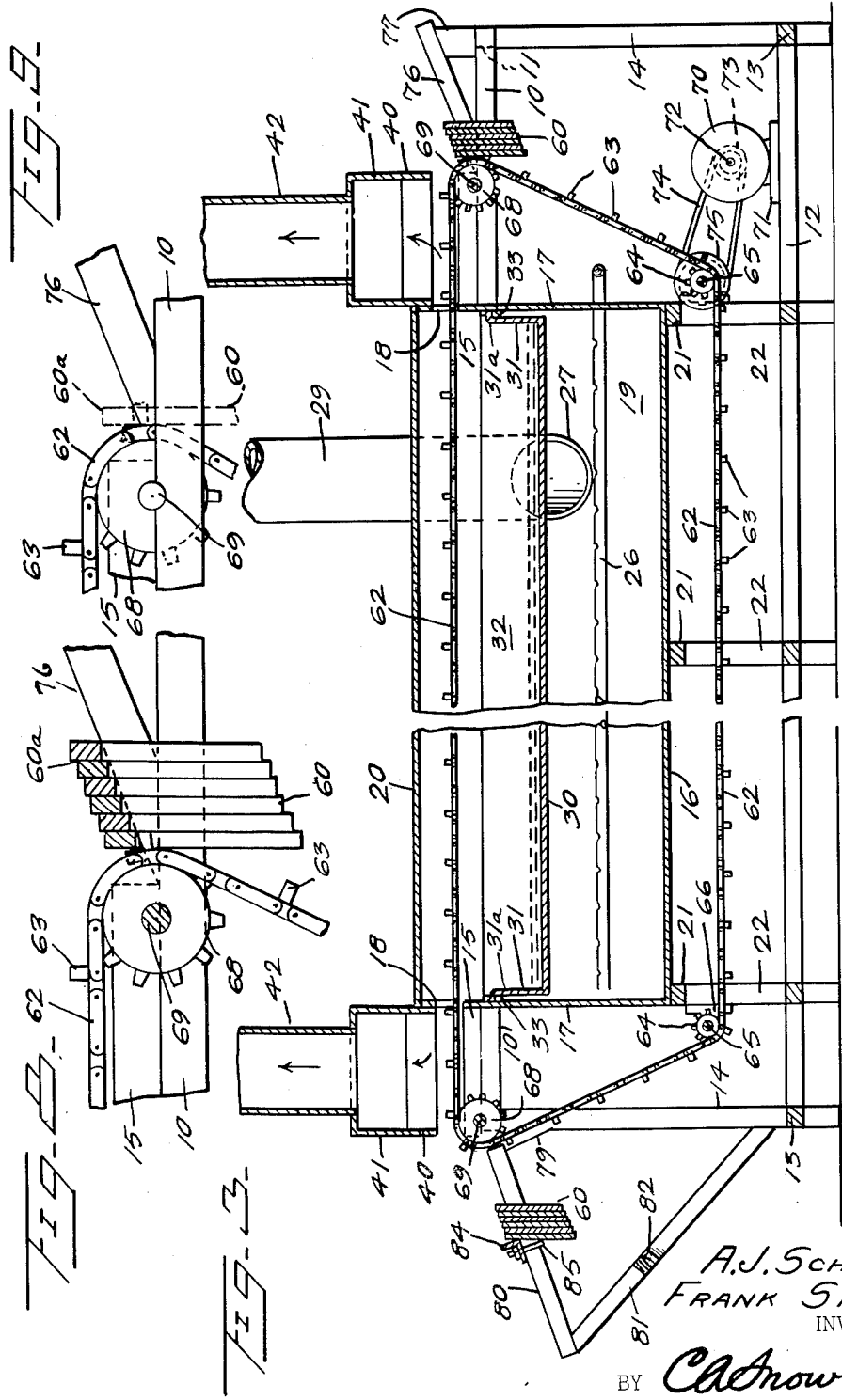

United States Patent Office 3,065,287
Patented Nov. 20, 1962

3,065,287
PROCESS AND APPARATUS FOR MANUFACTURING DRY CHARGED STORAGE BATTERY PLATES
Alton J. Schubert and Frank Sierra, San Antonio, Tex., assignors to Standard Electric Company, Inc., San Antonio, Tex.
Filed Dec. 7, 1960, Ser. No. 74,319
4 Claims. (Cl. 136—19)

This invention relates to a process and an apparatus for preserving the charged condition of the negative plates for dry charged lead-acid storage batteris. In particular it relates to a process and apparatus for treating or coating the dry charged negative plates so that they will not lose their charge through oxidzation during storage.

There are known processes for the initial washing and drying of the negative plates for storage batteries in a manner in which these plates will not ordinarily oxidize materially during the drying stage and such process is disclosed in U.S. Patent No. 2,831,669 to James C. Stamps, entitled "Apparatus and Process For Manufacture of Dry Charged Storage Batteries." In carrying out the invention according to that patent, the negative plates are dried in such a way that little or no oxidization of the active material occurs during the drying stage. Plates dried by this process will, when the battery is later filled with the electrolyte, deliver 90% or better, of the full rated capacity of the battery without additional charging.

It has been found, however, that these dry charged plates, as well as others produced by other processes, leave the negative active material of the dry charged negative plates in such condition that it has a great affinity for oxygen, particularly the oxygen of moisture in the ambient air. The situation is, therefore, that dry charged negative plates for lead-acid storage batteries, made by the processes at present known, will function in the battery so that the latter will deliver a good percentage of its rated capacity upon being filled with the electrolyte, provided that the negative dry charged plates have not come into contact with moisture. Even small amounts of moisture, such as are present in the atmosphere on a rainy or humid day, might start the oxidization of the dry charged negative plates made according to the known dry charging processes.

It is, therefore, the object of the present invention to produce dry charged negative plates for lead-acid storage batteries which are impervious to the moisture in the ambient atmosphere or on supporting surfaces or surrounding objects during storage.

It is another object of the present invention to provide dry charged negative plates for lead-acid storage batteries which are coated with a moisture impervious substance soluble in the electrolyte of the battery.

Still other objects, advantages and improvements will become apparent from the following specification, taken in connection with the accompanying drawings, in which:

FIGURE 1 is a side elevational view of the coating and drying oven used in carrying out the process according to the present invention.

FIG. 2 is a vertical sectional view, taken on the section line 2—2 of FIG. 1 and looking in the direction of the arrows, showing the front end of the coating and drying oven.

FIG. 3 is a longitudinal vertical sectional view through the coating and drying oven used in carrying out the process according to the present invention.

FIG. 4 is a transverse vertical sectional view, taken on the section line 4—4 of FIG. 1 and looking in the direction of the arrows, showing the interior of the coating and drying oven.

FIG. 5 is a transverse sectional view, taken on the section line 5—5 of FIG. 1 and looking in the direction of the arrows, showing the receiving rack for the storage battery plates at the rear end of the oven.

FIG. 6 is a longitudinal detail view, taken on the section line 6—6 of FIG. 5 and looking in the direction of the arrows, showing the stop on the receiving rack.

FIG. 7 is a fragmentary end elevational view of the blower which removes the spent vapors from the coating and drying oven.

FIG. 8 is a longitudinal vertical detail view, taken on the line 8—8 of FIG. 2 and looking in the direction of the arrows, showing the details of the feeding rack at the front end of the coating and drying ovens; and FIG. 9 is a view similar to FIG. 8, showing the action of the conveyor chains in lifting one of the storage battery plates from the feeding rack for travel through the coating and drying oven.

Referring now to the drawings in detail, and to FIGS. 1 and 3, in particular, the coating and drying oven is here shown as supported by a frame. The latter is comprised by upper longitudinal frame members or stringers 10—10, lower longitudinal frame members or stringers 12—12, upper front and rear transverse frame members 11—11 and lower front and rear transverse frame members 13—13. Corner frame members 14—14 complete the structure. The upper front longitudinal frame members 10—10 and the transverse frame members 11—11 are secured together, and to the corner frame members 14—14, and the lower longitudinal frame members 12—12 and the transverse frame members 13—13 are secured together, and to the corner frame members 14—14, in any suitable manner (not shown) to form a rigid structure. Within the frame the oven, which is of right angle parallelepiped shape, is mounted on additional transverse frame members 21—21. The latter are supported at their ends by addition vertically positioned frame members 22—22, which are secured to the lower longitudinal frame members 12—12 in any suitable manner (not shown). In its general construction the tank is comprised by a bottom 16, end walls 17—17, side walls 19—19, and a top 20, the bottom 16 resting on the transversely positioned frame members 21—21. Adjacent their tops the end walls are formed with transversely elongated apertures 18—18 through which parallel conveyor chains 62—62, to be later described, pass.

A gas line 23 is connected to a thermostatically regulated valve 24; a continuation 25 of this gas line extends to a burner 26, which passes through the front end wall 17 of the oven and is positioned longitudinally of the latter. In one side wall 19 of the oven there is mounted an outlet pipe 27, for the escape of the gaseous products of combustion. The outlet pipe 27 is connected by an elbow 28 to a vertically positioned flue 29.

A tray in which blocks of paraffine are placed and melted and vaporized is removably mounted within the oven and above the burner 26. This tray is also of right angle parallelepiped but open top construction. It is comprised by a bottom 30, end walls 31—31, and side walls 32—32. At their tops the end walls 31—31 are turned downwardly and outwardly to form flanges 31a—31a. These flanges rest on transversely positioned bars 33—33, which are welded or secured by bolts (not shown) to the end walls 17—17 of the oven.

A first thermo-responsive device 35 is positioned in the tray at approximately the mid-section of the latter, so as to be immersed in the molten paraffin of the tray. This thermo-responsive device 35 is connected by a cable 36, which extends through a suitable hole in one side wall 19 of the oven, to the valve 24 in the gas line.

A second thermo-responsive device 36 is likewise positioned in the tray at approximately the mid-section of the latter, so as to also be immersed in the molten paraffin in the tray. This thermo-responsive device 37 is connected by a cable 38, which in like manner extends through a suitable hole in one side wall 19 of the oven, to a pyrometer 39, which is mounted on the exterior of the side wall.

A vent system is provided for carrying off the unused and spent paraffin vapors. This system is comprised in part by two (2) risers 42—42, which at their lower ends terminate in hoods 41—41. The hoods 41—41 rest on supports 40—40 which are respectively secured to the end walls 17—17 of the oven. One hood 41 is positioned adjacent the aperture 18 in the front wall 17, through which the conveyor chains 62—62, enter the oven; the other hood 41 is positioned adjacent the aperture 18 in the rear wall 17, through which the conveyor chains 62—62 leave the oven. The risers 42—42 are respectively connected by elbows 43—43 to horizontally positioned conduit sections 44—44, which in turn are united in the branches of an inverted T 45. A blower 50 is mounted on a platform 55, which in turn is supported by a column 54. This blower has a vane carrying rotor 52, which is rotated by the shaft 57 of an electric motor 56. At its bottom the blower has outwardly extending flanges 53 and bolts 54 are positioned in suitable holes in these flanges to secure the blower to the platform 55; similarly, the electric motor 56 has outwardly extending flanges 58 at its bottom and bolts 59 likewise are positioned in suitable holes in these flanges to secure the motor to the platform 55. A central riser 46 is connected to the trunk of the inverted T 45 and this central riser is connected through an elbow 47 and a horizontal conduit section 48 centrally to the casing of the blower 50. An exit conduit 51 is connected tangentially to the casing of the blower.

The storage battery plates are shown at 60 in FIGS. 2 and 6. Each plate has oppositely extending ears 60a at its top.

A pair of parallel conveyor chains 62—62 carry the storage battery plates 60 through the oven. Each of these chains has uniformly spaced lugs 63 on its outer face. A spacing of three inches (3") has been found satisfactory for these lugs, but the spacing will vary with the height of the plates. Below the oven the conveyor chains run over chain sprockets 64—64, which are mounted on jack shifts 65. The latter are journalled in pillow block bearings 66, which are secured to the vertically positioned frame members 22 by bolts 67. Adjacent the top of the oven the conveyor chains run over similar chain sprockets 68—68, which are mounted on jack shafts 69—69. The latter are journalled in any suitable manner on the longitudinally positioned frame members or stringers 10—10. Bars 15—15 are secured to the longitudinally positioned frame members or stringers 10—10 and over the front and rear jack shafts 69—69. Between the front and rear jack shafts 69—69 the conveyor chains 62—62 run through the top of the oven, entering the latter through the aperture 18 in the front wall 17 and leaving same through the aperture 18 in the rear wall 17. An electric motor 70 is provided for driving the conveyor chains 62—62, and this motor has a shaft 72 on which there is mounted a chain pinion 73. This motor is mounted on the lower longitudinally positioned frame members or stringers 12—12 by bolts (not shown), which are positioned in suitable holes in the bottom flanges 71 of the motor. A driving chain 74 is trained over the chain pinion 73 and a chain sprocket 75 on the lower front jack shaft 64.

A feeding rack is provided at the front end of the oven. This rack is comprised by parallel bars 76—76, which are spaced apart a distance slightly greater than the width of the main body portion of the storage battery plates 60. At their outer ends the bars 76—76 are supported at a level slightly above the rear chain sprockets 68—68 by a block 77, which latter is mounted on the upper front transversely positioned frame member 11; at their inner ends the bars 76—76 are supported at approximately the level of the front jack shaft 69 by cleats 78—78, which extend inwardly respectively from the longitudinally positioned frame members or stringers 10—10.

Similarly, a receiving rack is positioned at the rear of the oven. This rack is comprised by parallel bars 80—80, which are likewise spaced apart a distance slightly greater than the width of the main body portion of the storage battery plates 60. At their inner ends the bars 80—80 are supported slightly below the level of the upper rear jack shaft 69 on the upper rear transversely positioned frame member 11, as by brackets 79; at their outer ends the bars 80—80 are respectively secured in any suitable manner (not shown) to other bars 81—81, which latter extend inwardly and downwardly and are secured to the rear lower transversely positioned frame member 13 in any suitable manner (not shown). A cross brace 82 may be secured between the bars 81—81, if desired. The storage battery plates 60 are held in place by a stop 84, which is positioned across the bars 80—80. This stop is comprised by an angle bracket having one flange resting on the bars 80—80 and the other flange in upright position. U bolts 85 partially surround the bars 80—80 and have their shanks extending through suitable holes in the flange which rests on the bars 80—80 and nuts 86 are received on the outer ends of the shanks.

In operation, the paraffine is in the tray 30 and is kept in the liquid state by the burner 26. The temperature is regulated to uniformity by the thermo-responsive device 35, which controls the gas valve 24. A direct reading of the temperature of the paraffin in the tray 30 can be obtained from the pyrometer 39. Conveyor chains 62—62 are driven by the electric motor 70. The lugs 63 on the conveyor chains 62—62 engage the ears 60a—60a on the storage battery plates 60 and lift the latter from the rack 70. The plates are carried from the rack 76 in the horizontal position until the bottoms of the respective plates clear the inlet aperture 18 in the front wall 17 of the oven. Then the plates swing downwardly to the vertical position. It is preferable that the bottoms of the plates pass above the level of the molten paraffin in the tray 30 at a distance of approximately three inches (3"), but this distance is given by way of example only. The thickness of the coating of paraffin on the plates 60 can be determined by the time of travel of the plates through the oven. The time of travel is goverened by varying the velocity of the conveyor chains 62—62, which in turn is controlled by regulating the speed of the electric motor 70. After passing through the exit aperture 18 in the rear wall 17 of the tank, the plates again travel in horizontal position on the conveyor chains 62—62, until they reach the rear chain sprockets 68—68 and slide down the rack 80 until they strike the stop 64, or previously discharged plates resting against this stop. They may then be removed from the rack 80 by hand. The gaseous products of combustion pass out of the oven through the flue 29. Also, the spent or unused paraffin vapors pass out of the inlet aperture 18 in the front wall 17 of the oven and the exit aperture 18 in the rear wall 17 of the oven into the respective hoods 41—41 and are drawn off by the blower 50 through the risers 42—42.

Having now fully described our invention, what we claim as new and useful and desire to secure by Letters Patent of the United States is:

1. A process of protecting the negative plates of a dry charged lead acid battery from oxidation during storage prior to addition of the acid thereto, and the resultant loss of charge created by such oxydation which comprises the step of exposing said plates to a controlled atmosphere of a vaporized ceriferous substance for a length of time sufficient to permit discrete particles to coat said plate to an extent sufficient to protect the surface of said plates from contact with atmospheric moisture but insufficient to preclude the permeation of battery acid thereinto when said acid is introduced into the battery, whereby said battery is substantially fully charged immediately upon the introduction of said acid.

2. The process of claim 1 wherein said negative plate in charged condition and dried for storage is comprised of spongy metallic lead, said acid is sulphuric acid, and the ceriferous substance is paraffin.

3. The process of claim 2 wherein the exposure of said plates is occasioned by passing said plates continuously through said atmosphere, said atmosphere is created by raising the temperature of a body of paraffin to the vaporization point and the duration of the time of exposure is controlled by the speed of the passage of said plates through said atmosphere.

4. An article of manufacture constructed according to the process of claim 3 comprising a pre-charged negative plate for a dry charged lead acid battery comprised of spongy metallic lead coated with a ceriferous layer of a thickness sufficient to repel water but insufficient to preclude the permeation of said plate with battery acid.

References Cited in the file of this patent

UNITED STATES PATENTS

| | | |
|---|---|---|
| 236,198 | Weyde | Jan. 4. 1881 |
| 668,215 | Reed | Feb. 19, 1901 |
| 1,141,930 | Buch | June 8, 1915 |
| 1,468,259 | Carpenter | Sept. 18, 1923 |
| 1,725,734 | Heap | Aug. 20, 1929 |
| 1,749,819 | Hutchinson | Mar. 11, 1930 |
| 1,998,060 | Seibt | Apr. 16, 1935 |
| 2,159,351 | Burns | May 23, 1939 |
| 2,233,593 | Eddy et al. | Mar. 4, 1941 |
| 2,285,017 | Christensen | June 2, 1942 |
| 2,368,130 | Fox | Jan. 30, 1945 |
| 2,834,826 | Reid et al. | May 13, 1958 |